United States Patent
Baugher, III et al.

(10) Patent No.: US 11,481,590 B1
(45) Date of Patent: Oct. 25, 2022

(54) PILL BOTTLES WITH CONDUCTIVE INK AND READING SYSTEMS AND METHODS

(71) Applicant: Express Scripts Strategic Development, Inc., St. Louis, MO (US)

(72) Inventors: Kerry L. Baugher, III, O'Fallon, IL (US); Madeline McGraw, St. Louis, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 16/995,034

(22) Filed: Aug. 17, 2020

(51) Int. Cl.
| G06K 19/067 | (2006.01) |
| G06K 19/08 | (2006.01) |
| A61J 1/03 | (2006.01) |
| B65C 9/46 | (2006.01) |
| G06K 7/10 | (2006.01) |
| G06K 7/08 | (2006.01) |
| C09D 11/52 | (2014.01) |

(52) U.S. Cl.
CPC .............. *G06K 19/067* (2013.01); *A61J 1/03* (2013.01); *B65C 9/46* (2013.01); *C09D 11/52* (2013.01); *G06K 7/08* (2013.01); *G06K 7/1095* (2013.01); *G06K 19/086* (2013.01)

(58) Field of Classification Search
CPC .. G06K 19/067; G06K 19/086; G06K 7/1095; G06K 7/08; A61J 2205/10; A61J 1/03; A61J 1/00; C09D 11/52; B65C 9/46; A61K 1/03
See application file for complete search history.

(56) References Cited

U.S. PATENT DOCUMENTS

| 6,168,080 | B1 * | 1/2001 | Verschuur ................ B07C 1/00 235/451 |
| 7,370,797 | B1 * | 5/2008 | Sullivan ................ G06K 17/00 235/462.01 |
| 9,299,053 | B2 * | 3/2016 | Gazdzinski ............ G06Q 10/02 |
| 9,834,367 | B1 | 12/2017 | Veltri |
| 9,835,434 | B1 * | 12/2017 | Sloo .................... H04L 12/2807 |
| 9,872,808 | B2 | 1/2018 | Gipson |
| 9,977,547 | B1 * | 5/2018 | Sloo ........................ G06K 19/08 |
| 10,204,212 | B1 * | 2/2019 | Nordstrom ............ G16H 10/60 |
| 10,248,820 | B2 | 4/2019 | Allen |
| 10,398,628 | B2 | 9/2019 | Raghuprasad |
| 10,486,409 | B1 * | 11/2019 | Chang ................... B32B 43/006 |
| 10,528,703 | B1 * | 1/2020 | Baek .................... G06K 15/024 |
| 10,532,861 | B2 | 1/2020 | Kimmel |
| 10,584,504 | B2 | 3/2020 | Drakulich |
| 10,604,953 | B2 | 3/2020 | Drakulich |
| 10,686,963 | B1 * | 6/2020 | Rodriguez ......... H04N 1/32261 |
| 10,947,012 | B1 * | 3/2021 | Johnson .................... A61J 1/03 |

(Continued)

FOREIGN PATENT DOCUMENTS

WO      2017070070 A1    4/2017

OTHER PUBLICATIONS

CVS Pharmacy, CVS Pharmacy introduces new app feature for reading "talking" prescription labels, Jul. 8, 2020.

*Primary Examiner* — Daniel I Walsh
(74) *Attorney, Agent, or Firm* — Harness IP

(57) ABSTRACT

A pill bottle for prescribed pills includes: a circular top portion having an aperture; a circular bottom portion; walls that form a cylinder and connect the circular top portion with the circular bottom portion; and a pattern of electrically conductive ink disposed on an exterior surface of the walls.

20 Claims, 13 Drawing Sheets

(56) References Cited

U.S. PATENT DOCUMENTS

| | | | |
|---|---|---|---|
| 11,157,596 B1* | 10/2021 | Eby | G06Q 10/087 |
| 11,337,533 B1* | 5/2022 | Perrelli | B65D 47/122 |
| 2002/0196979 A1* | 12/2002 | Yen | G06K 7/14 |
| | | | 382/190 |
| 2003/0080191 A1* | 5/2003 | Lubow | G06K 1/121 |
| | | | 235/462.01 |
| 2003/0222091 A1* | 12/2003 | Gerold | G07F 13/025 |
| | | | 221/92 |
| 2004/0065739 A1* | 4/2004 | Xu | G06K 19/06046 |
| | | | 235/462.1 |
| 2004/0074958 A1* | 4/2004 | Foth | G06K 19/067 |
| | | | 235/375 |
| 2005/0019796 A1* | 1/2005 | Meiring | G06K 19/06196 |
| | | | 435/6.11 |
| 2006/0020469 A1* | 1/2006 | Rast | G02F 1/167 |
| | | | 704/270 |
| 2006/0144919 A1* | 7/2006 | Tong | G09F 3/0297 |
| | | | 235/375 |
| 2006/0163103 A1* | 7/2006 | Adler | G09F 3/02 |
| | | | 206/459.5 |
| 2007/0057311 A1* | 3/2007 | Leenders | B82Y 10/00 |
| | | | 257/315 |
| 2007/0146140 A1* | 6/2007 | Nagao | G09F 3/10 |
| | | | 340/572.8 |
| 2007/0252378 A1* | 11/2007 | Chambers | G09F 3/10 |
| | | | 283/81 |
| 2008/0014550 A1* | 1/2008 | Jones | A61M 5/178 |
| | | | 433/114 |
| 2008/0309497 A1* | 12/2008 | Bryant | G06K 19/04 |
| | | | 340/572.8 |
| 2009/0017271 A1* | 1/2009 | Meiring | G06K 7/1456 |
| | | | 428/195.1 |
| 2009/0066517 A1* | 3/2009 | Erikson | G06K 19/07749 |
| | | | 340/572.7 |
| 2009/0114713 A1* | 5/2009 | Spenik | G06Q 10/087 |
| | | | 235/375 |
| 2012/0173440 A1* | 7/2012 | Dehlinger | B65F 1/1484 |
| | | | 705/308 |
| 2012/0278228 A1* | 11/2012 | Rubinstein | G07F 9/026 |
| | | | 705/39 |
| 2013/0072303 A1* | 3/2013 | Mineur | A63F 3/00643 |
| | | | 463/37 |
| 2013/0105587 A1* | 5/2013 | Simske | G06K 19/083 |
| | | | 235/492 |
| 2013/0194192 A1* | 8/2013 | Andolina | G06V 10/147 |
| | | | 382/229 |
| 2014/0151250 A1* | 6/2014 | Nguyen | G09F 23/10 |
| | | | 206/232 |
| 2014/0201094 A1* | 7/2014 | Herrington | G06Q 30/018 |
| | | | 705/317 |
| 2014/0202978 A1* | 7/2014 | Hwang | A61J 7/04 |
| | | | 215/230 |
| 2015/0353236 A1* | 12/2015 | Gentile | B65D 25/34 |
| | | | 235/375 |
| 2015/0379237 A1* | 12/2015 | Mills | G16H 40/40 |
| | | | 705/2 |
| 2016/0019528 A1* | 1/2016 | Hong | G06Q 20/405 |
| | | | 705/44 |
| 2016/0217270 A1* | 7/2016 | Ferguson | G06F 16/245 |
| 2016/0274048 A1* | 9/2016 | Mehregany | A61J 1/03 |
| 2017/0038907 A1* | 2/2017 | Buckett | G06F 3/0416 |
| 2017/0193124 A1* | 7/2017 | Wong, Jr. | G06K 19/0723 |
| 2017/0221132 A1* | 8/2017 | Howell | G06Q 30/0635 |
| 2018/0005295 A1* | 1/2018 | Howell | G06Q 10/087 |
| 2018/0117895 A1 | 5/2018 | Brook | |
| 2018/0240540 A1* | 8/2018 | O'Keefe | A61J 7/0472 |
| 2018/0314359 A1* | 11/2018 | Mathew | B41M 5/0023 |
| 2019/0021393 A1* | 1/2019 | Novak | B65D 85/10 |
| 2019/0193922 A1 | 6/2019 | Poirier | |
| 2019/0218805 A1 | 7/2019 | Drakulich | |
| 2019/0240114 A1* | 8/2019 | Arric | A61J 7/0463 |
| 2019/0274921 A1* | 9/2019 | Mehregany | A61J 7/04 |
| 2019/0328615 A1 | 10/2019 | Raghuprasad | |
| 2019/0328616 A1 | 10/2019 | Albanawi | |
| 2020/0090797 A1* | 3/2020 | Gylleby | A61B 90/90 |
| 2020/0273282 A1* | 8/2020 | Olmstead | G06K 7/10871 |
| 2020/0364523 A1* | 11/2020 | Badri | G06K 19/0702 |
| 2020/0372742 A1* | 11/2020 | Poddar | A61J 1/1412 |
| 2021/0344991 A1* | 11/2021 | Todd | H04N 21/4622 |

\* cited by examiner

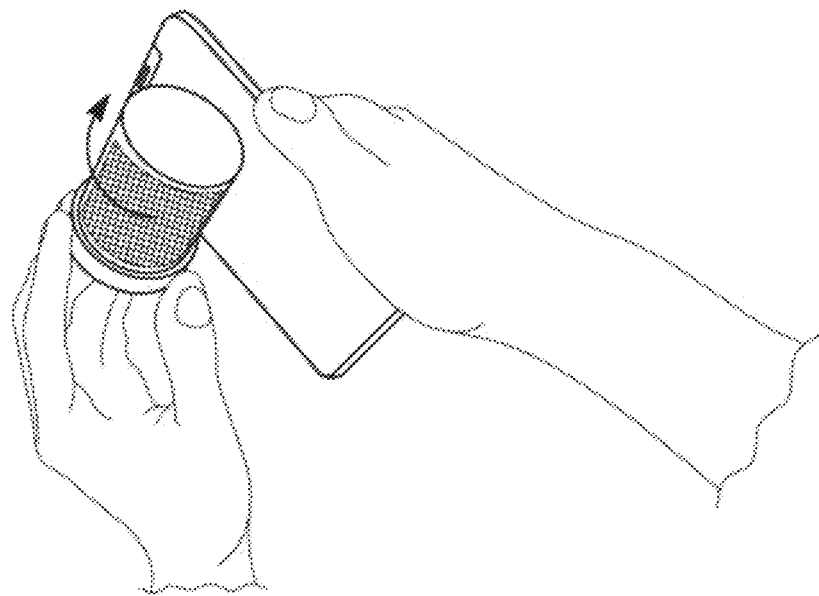
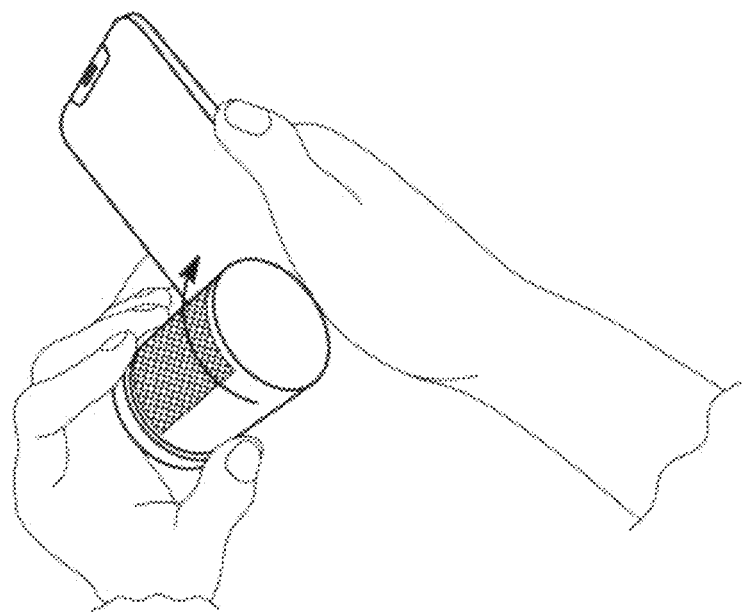
FIG. 7

PILL BOTTLES WITH CONDUCTIVE INK AND READING SYSTEMS AND METHODS

FIELD

The present disclosure relates to pill bottles having electrically conductive ink and systems and methods for reading electrically conductive ink printed on pill bottles.

BACKGROUND

Medicine in pill form may be packaged in multiple different forms. For example, pills may be packaged in single dose packs or multiple doses may be packaged in a pill bottle.

Pill bottles are made in multiple shapes and sizes. For example, some pill bottles are cylindrical. Some pill bottles are transparent and some pill bottles are non-transparent. Contents of transparent pill bottles can be seen through the transparent pill bottles.

A label may be applied to an exterior surface of a pill bottle. The label may indicate a name of the pills within the pill bottle and other information. Examples of other information that may be included on the label of a pill bottle include the number of pills initially included in the pill bottle, a dosage frequency, a name of a prescriber of the medication, etc.

Some people may be sensitive to other people knowing what types of medication they are taking. What type of medication a person is taking may be easily read from the label of a pill bottle if the name of the medication is on the label of the pill bottle. Also, thieves may steal some types of pills, for example, after reading the name of the medication on the label of a pill bottle.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In a feature, a pill bottle for prescribed pills includes: a circular top portion having an aperture; a circular bottom portion; walls that form a cylinder and connect the circular top portion with the circular bottom portion; and a pattern of electrically conductive ink disposed on an exterior surface of the walls.

In further features, a cap is configured to seal the aperture in the circular top portion.

In further features, the pattern of electrically conductive ink includes: a start line of dots of electrically conductive ink having a first configuration; an end line of dots of electrically conductive ink having a second configuration that is different than the first configuration; and at least two input lines of dots of electrically conductive ink that do not have the first or second configuration.

In further features, the start line of dots includes at least three dots of electrically conductive ink.

In further features, the end line of dots includes at least three dots of electrically conductive ink.

In further features: the input lines of dots include X dots of electrically conductive ink; the start and end lines of dots include Y dots of electrically conductive ink; X and Y are integers greater than zero; and X is one of greater than and less than Y.

In further features: the start line of dots includes three dots of electrically conductive ink; the end line of dots includes three dots of electrically conductive ink; and the input lines of dots include two dots of electrically conductive ink.

In further features, the input lines of dots are disposed between the start and end lines of dots.

In further features, the start, end, and input lines of dots are approximately parallel.

In further features, the start, end, and input lines of dots are approximately parallel to the walls and approximately perpendicular to the circular top and bottom portions.

In further features, the pattern of electrically conductive ink includes at least five input lines of dots of electrically conductive ink.

In further features, the pattern of electrically conductive ink is disposed on a label that is adhered to the exterior surface of the walls.

In further features, a name of prescribed pills is not present anywhere on the pill bottle.

In further features, the dots of electrically conductive ink are circular.

In a feature, a pill bottle labeling system includes: a pattern module configured to generate a pattern of dots of electrically conductive ink; a conductive ink printer configured to print the pattern of dots of electrically conductive ink on a first surface of a label; and a labeling device configured to apply a second surface of the label to a cylindrical surface of a cylindrical pill bottle.

In further features: a randomization module is configured to selectively output a randomly generated number, and the pattern module is configured to generate the pattern of dots of electrically conductive ink based on the randomly generated number.

In further features, the pattern module is configured to generate the pattern of dots of electrically conductive ink based on information regarding a prescription to be included in the cylindrical pill bottle.

In further features, the pattern includes: a start line of dots of electrically conductive ink having a first configuration; an end line of dots of electrically conductive ink having a second configuration that is different than the first configuration; and at least two input lines of dots of electrically conductive ink that do not have the first or second configuration.

In further features, the dots are circular.

In further features, the labeling device is configured to apply the second surface of the label to the cylindrical surface of the cylindrical pill bottle such that the start, end, and input lines of dots are approximately perpendicular to circular top and bottom portions of the cylindrical pill bottle.

In a feature. a computing device includes: a capacitive touchscreen display; a processor module configured to: store outputs of the capacitive touchscreen display received while a pill bottle having a pattern of dots of electrically conductive ink is rolled across the capacitive touchscreen display; determine encoded values based on distances between ones of the dots of the pattern; transmit a query for information regarding prescribed medication within the pill bottle via a network; receive a response including information regarding the prescribed medication within the pill bottle via the network; and display the information regarding the prescribed medication within the pill bottle on the capacitive touchscreen display.

In further features, the pattern includes: a start line of dots of electrically conductive ink having a first configuration; an end line of dots of electrically conductive ink having a second configuration that is different than the first configuration; and at least two input lines of dots of electrically conductive ink that do not have the first or second configuration.

In further features, the processor module is configured to determine the encoded values based on distances between ones of the dots of the input lines of dots.

In further features, the processor module is configured to determine the encoded values further based on a first distance between a first pair of dots of the start line.

In further features, the processor module is configured to determine an expected number of the input lines based on a first distance between a first pair of dots of the start line and a second distance between a second pair of dots of the start line, where the first and second pairs include at least one different dot.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 7 is a perspective view illustrating an example of a user rolling a pill bottle with conductive ink across a touchscreen display of a computing device.

In the drawings, reference numbers may be reused to identify similar and/or identical elements.

DETAILED DESCRIPTION

Pill bottles of prescribed medication may include labels including information regarding the prescribed medication, the prescriber, the person to which the medication is prescribed, etc. The information regarding the prescribed medication can be read off of the exterior of such a pill bottle.

According to the present application, a patterns of conductive ink is printed on the exterior of (e.g., the label of) a cylindrical pill bottle. All of the information that is typically present on the exterior of the pill bottle is not provided on the exterior of the pill bottle. For example, a name of the prescribed medication may not be provided on the exterior of the pill bottle, the person to which the medication is prescribed may not be provided on the exterior of the pill bottle, etc.

The pill bottle can be rolled across a computing device having a touchscreen display, such as a cellular phone. The conductive ink is perceived by the computing device as touches. The computing device determines the pattern and transmits a request (e.g., including at least a portion of the pattern) to a retrieval module. The retrieval module retrieves the information regarding the prescribed medication of the pill bottle based on information in the request and transmits the information regarding the prescribed medication back to the computing device. The computing device can the output (e.g., display) the information regarding the prescribed medication. This increases privacy and may decrease theft of pill bottle contents.

High-Volume Pharmacy

Figure 1:
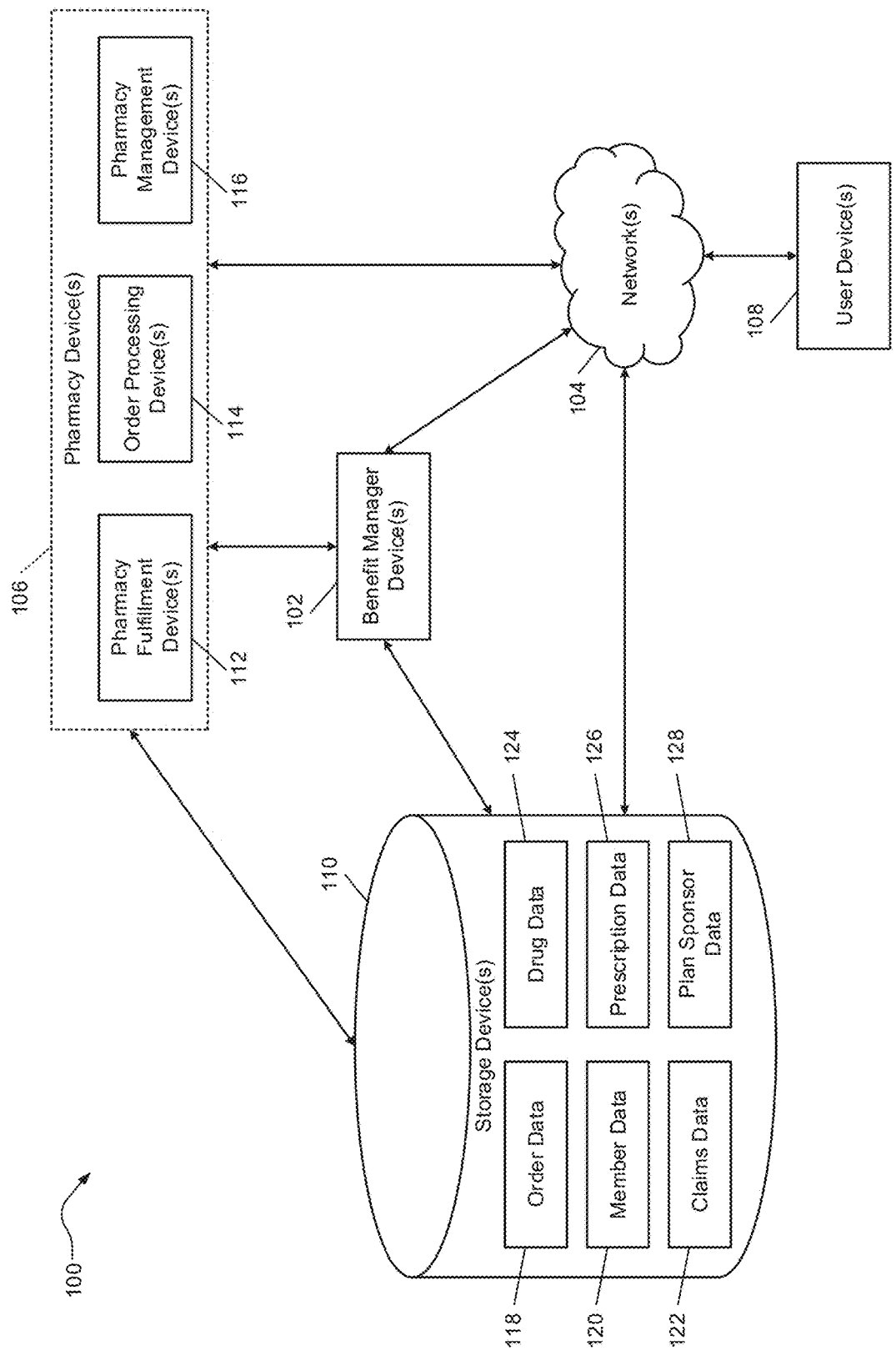
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically (via automation). The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Va.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfilment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order, as described further below.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

As discussed further below, pill bottles may be labeled using a pattern printed using conductive ink. None of the order data 118 and none of the member data 120 on the labels. Only the pattern of conductive ink may be printed on the labels. The pattern of conductive ink may be used to determine one or more pieces of order data and/or member data by rolling the pill bottle across a touchscreen display of a computing device, such as a cellular phone or a tablet device.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126. In various implementations, one or more of the order data 118, the member data 120, the claims data 122, the drug data 124, and the prescription data 126 may be combined.

The plan sponsor data 128 includes information regarding the plan sponsors of the PBM. Examples of the plan sponsor data 128 include company name, company address, contact name, contact telephone number, contact e-mail address, etc.

Figure 2:
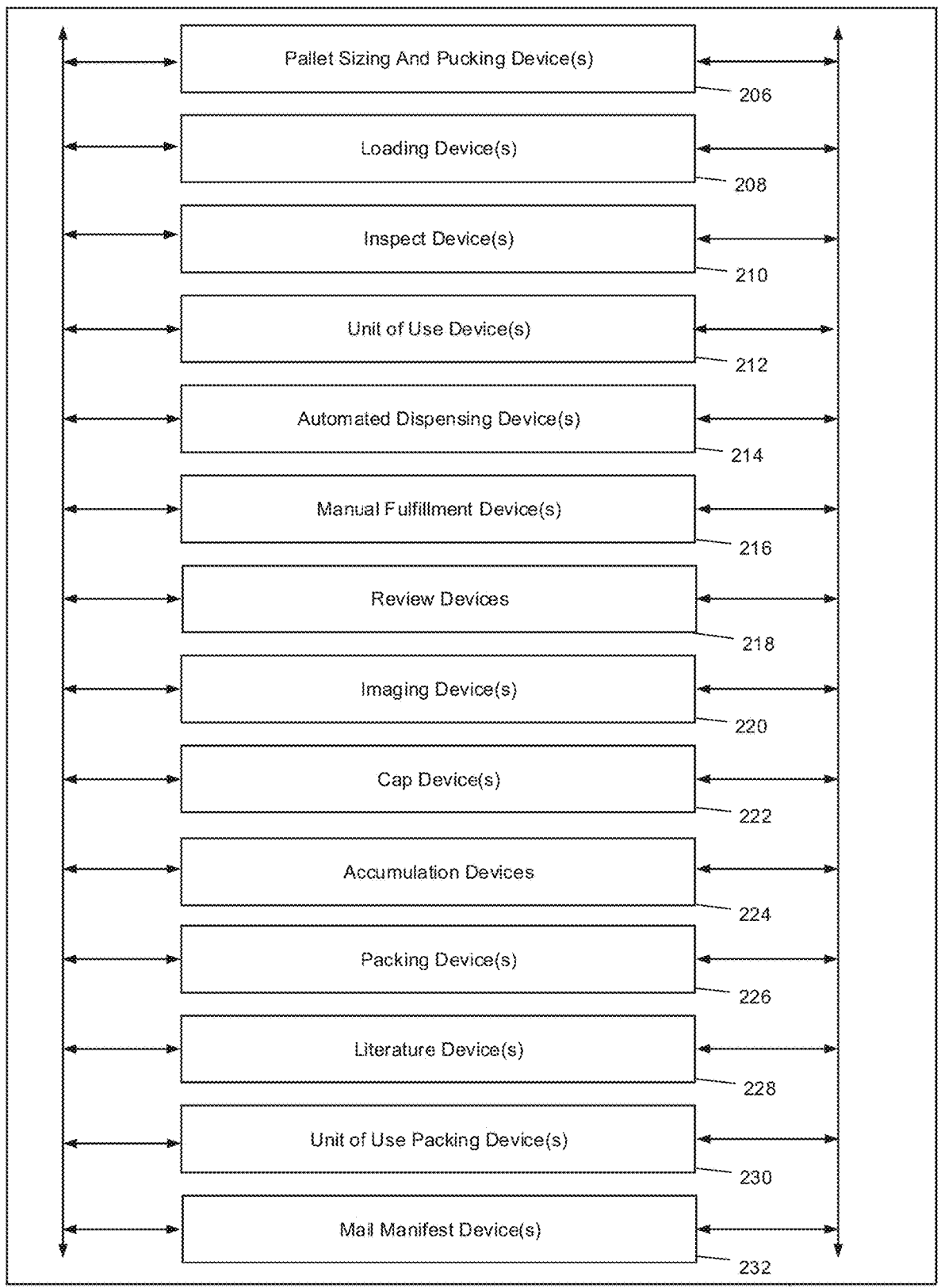
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
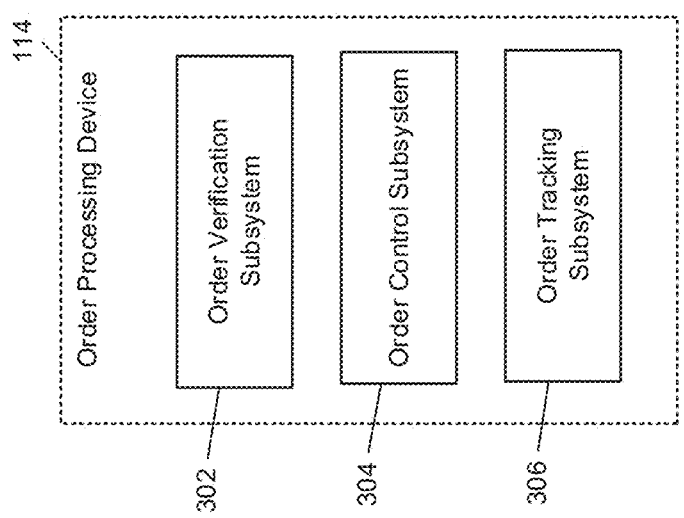
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Electrically Conductive Ink

Figure 4:
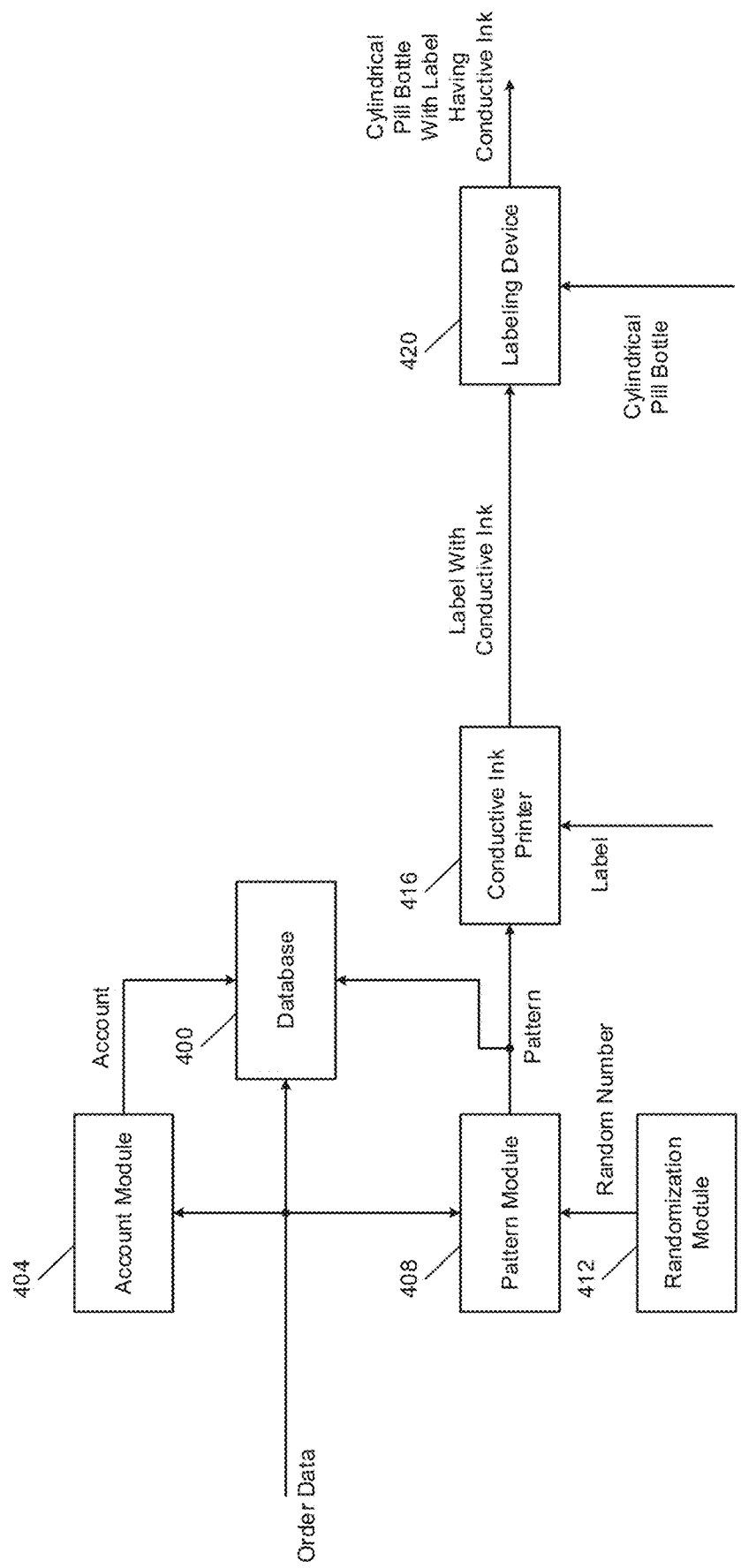
FIG. 4 is a functional block diagram of an example conductive ink labeling system.

FIG. 4 is a functional block diagram of an example conductive ink labeling system. As discussed above, the order data for a prescription may include various information for fulfilling a prescription and data associated with a user of the prescription. For example, the order data may include a name of a prescription drug to be included in a pill bottle, a dosage size of each the pills to be included in the pill bottle, a total number of pills of the drug to be included in the pill bottle, a length that the total number of pills is to be used over, a prescription (Rx) number of the prescription, a member name, a date of birth of the member, a fill date of the prescription, a number of refills remaining, an expiration date of the prescription, a name of a prescriber of the prescription, and a phone number of the prescriber. The order data may also include other information. The order data may also be referred to as order information.

The order data is stored in a database 400. An account module 404 determines a (web) account associated with the member of the prescription. The web account may include, for example, a username, an email address, a telephone number, or another suitable unique identifier of the member. The member may select the unique identifier of the member for the member's web account during creation of the web account. The account module 404 stores the members account information (e.g., the unique identifier) in association with the order data in the database 400. The pattern of conductive ink on the pill bottle including the prescribed medication can later be used to determine the order information. The order information need not be printed on the pill bottle itself.

A pattern module 408 determines a pattern of conductive ink to be printed on the pill bottle of the prescription. The pattern of conductive ink can be printed on a label that is adhered to the exterior of the pill bottle or printed directly on the exterior surface of the pill bottle. The pills may be placed within the pill bottle and the pill bottle may be capped before or after the conductive ink is added to the exterior of the pill bottle. The pills may be placed within the pill bottle and the pill bottle may be capped mechanically (e.g., by a pharmacist) or using one or more one or more automated devices (e.g., pharmacy devices 112).

The pattern module 408 may determine the pattern using an encoder. The input to the encoder may be, for example, the order data or a random number generated by a randomization module 412.

The randomization module 412 may randomly generate a unique number for each different pill bottle that is to receive a pattern of conductive ink. As discussed further below, the pattern of the conductive ink can be used to determine the order information using computing device with a touchscreen display.

The pattern module 408 stores the pattern in the database 400 in association with the account of the member and the order data. The pattern and the account of the member can therefore be used to determine the order data for the pill bottle, which is not included on the exterior of the pill bottle. All that may be present and visible on the exterior of the pill bottle is the pattern of the conductive ink.

A conductive ink printer 416 receives a label and prints the pattern of conductive ink on the label. A labeling device 420 receives a pill bottle not having a label (with or without the prescribed pills already present in the pill bottle) and applies the label (including the pattern of conductive ink) on the exterior of the pill bottle. Alternatively, application of the label to the exterior of the pill bottle may be performed manually.

In various implementations, the conductive ink printer 416 may print the pattern of the conductive ink directly on the exterior of the pill bottle. In such implementations, the labeling device 420 may be omitted.

The pattern of the conductive ink is unique and may include a pattern of dots of electrically conductive ink. While the example of dots (circles) is provided and will be discussed herein, conductive ink may be printed in another suitable shape, such as triangles, rectangles, squares, ovals, stars, lines, etc. Dots, as used herein, may include circular and non-circular shapes. The dots may all be the same shape and size or different shapes and/or sizes may be used.

Figure 5:
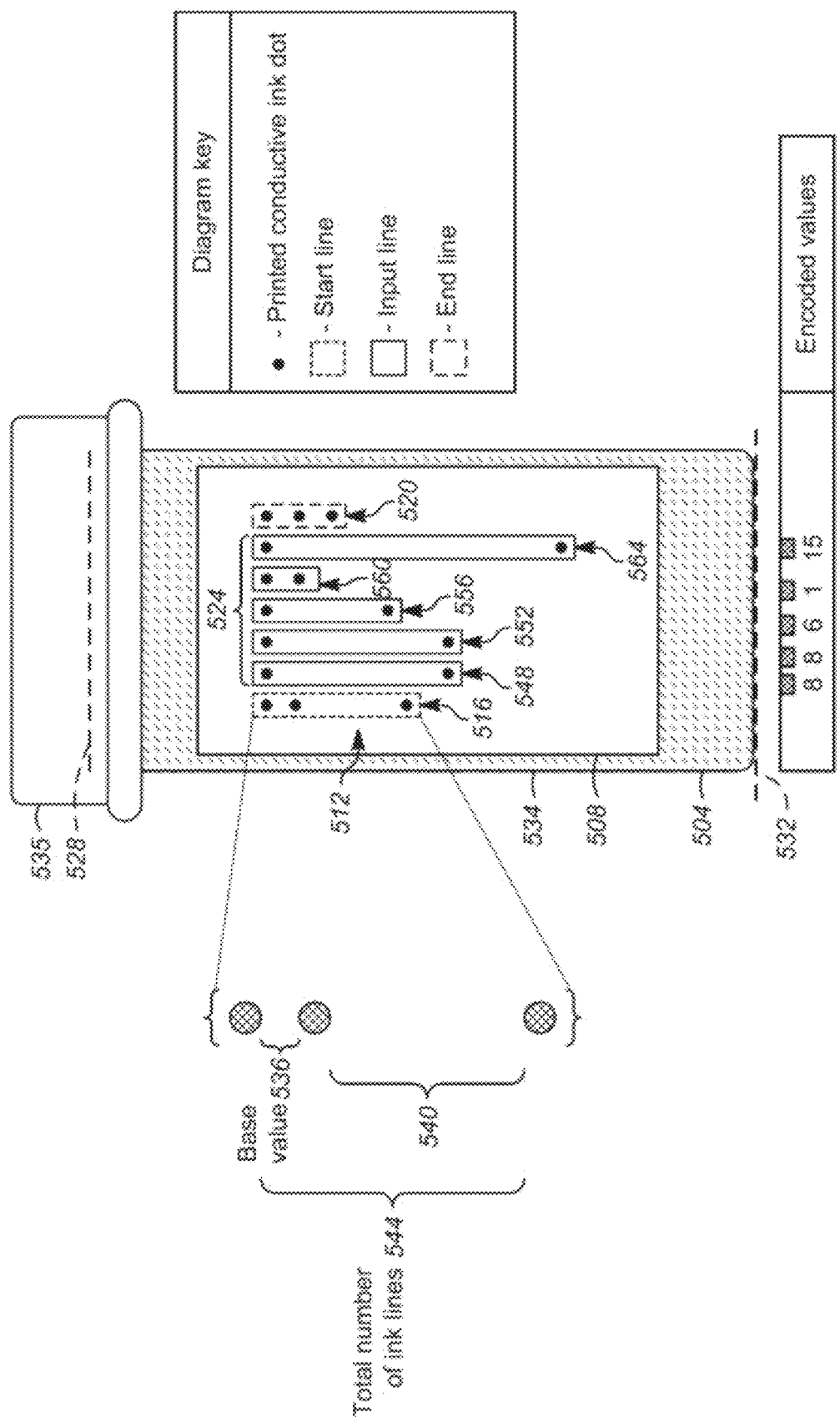
FIG. 5 includes a perspective view of an example pill bottle with a label adhered to the exterior surface of the pill bottle.

FIG. 5 includes a perspective view of an example pill bottle 504 with a label 508 adhered to the exterior surface of the pill bottle 504. The pill bottle 504 is cylindrical. A pattern 512 of dots of (electrically) conductive ink is printed on a first side of the label 508. A second side of the label 508 is applied to the exterior surface of the pill bottle 504, such as via an adhesive on the second side of the label 508.

The conductive ink includes one or more electrically conductive materials, such as graphite, a metal, a conductive polymer, or another type of electrically conductive material. The conductive ink has at least a predetermined conductivity. The predetermined conductivity is greater than zero Siemens per meter (S/m) and may be greater than $10^3$ S/m.

The pattern 512 includes a start line 516, an end line 520, and input lines 524. The start, end, and input lines 516, 520, and 524 are approximately perpendicular to top and bottom surfaces 528 and 532 of the pill bottle 504. The top and bottom surfaces 528 and 532 are circular. Walls 534 connect the top and bottom surfaces 528 and 532 and forming a cylinder. Approximately as used herein may mean+/−10 degrees. The top surface 528 includes an aperture. The bottom surface 532 is closed and does not include an aperture as to form a floor of the pill bottle 504. A cap 535 seals the aperture in the top surface 528. For example, the cap 535 may screw onto threads on the pill bottle 504. While the example of the pattern including lines of dots of electrically conductive ink, the present application is also applicable to patterns of dots of electrically conductive ink that are arranged non-linearly.

The start line 516 includes a first predetermined number of dots and a first configuration of dots of conductive ink. The end line 520 includes a second predetermined number of dots and a second configuration of dots of conductive ink.

The first and second predetermined numbers may be the same or different. In other words, the start and end lines 516 and 520 may have the same or different numbers of dots. The first and second predetermined numbers may be greater than or equal to three. For example, the first and second predetermined numbers may be three as in the example of FIG. 5. The first and second predetermined numbers may be limited, for example, to a maximum number of simultaneous touches recognizable by a touchscreen display. A greater number of dots, however, may increase a likelihood of misinterpretation.

The first and second configurations of dots, however, are different. The first and second configurations being different allows for the start line 516 to be distinguished from the end line 520. For example, the end line 520 may have (e.g., 3) equally spaced dots. Dot spacing may be measured edge to edge (e.g., as illustrated in the example of FIG. 5), center to center, or in another suitable manner. Dot spacing measurement may be constrained by touchscreen interpretation. Touch screens may output a touch coordinate at the center of a dot (or touch) regardless of dot (or touch) size.

The start line 516 may include a first dot spacing 536 and a second dot spacing 540. The first dot spacing 536 is the smaller one of the first and second dot spacings 536 and 540 and may correspond to a base value. The base value is used to normalize spacing between dots on all other dot lines (including the input lines 524). The first dot spacing 536 may be equal to the dot spacing between the dots of the end line 520.

A third dot spacing 544 is present between the top most dot and the bottom most dot of the start line 516. Top and bottom may be expressed in the vertical sense herein with respect to the pill bottle 504 sitting upon the bottom surface 532. The third dot spacing 544 divided by the first dot spacing 536 between the may correspond to the number of input lines 524 + the number of start lines+ the number of end lines included on the pill bottle 504. In other words, the third dot spacing 544 divided by the first dot spacing 536 between the may correspond to the total number of lines of dots on the pill bottle 504. In the example of FIG. 5, the third dot spacing 544 divided by the first dot spacing 536 is equal to 7, and 7 total lines are provided on the pill bottle 504 (1 end line+1 start line+5 input lines=7).

While the example of one start line is provided, two or more start lines may be used. Also, while the example of one end line is provided, two or more end lines may be used. Also, while the example of five input lines is provided, a greater or lesser number of input lines may be used. As stated above, however, the third dot spacing 544 is indicative of the total number of lines included on the pill bottle 504.

Each of the input lines 524 includes a third predetermined number of dots. The third predetermined number of dots may be less than the first and/or second predetermined numbers of dots. In the example of FIG. 5, each of the input lines 524 includes 2 dots.

The spacing between the dots of an input line divided by the first dot spacing 536 corresponds to an encoded value. In various implementations, the encoded values may be integers greater than or equal to 1. The encoded values are indicative of the pattern generated by the pattern module 408 based on the random number and/or the order data. The pattern generated by the pattern module 408 for the pill bottle 504 is indicative of the pattern of dots of the start, end, and input lines 516, 520, and 524.

In the example of FIG. 5, the spacing between the dots of a first input line 548 divided by the first dot spacing 536 is equal to 8. The spacing between the dots of a second input line 552 divided by the first dot spacing 536 is equal to 8. The spacing between the dots of a third input line 556 divided by the first dot spacing 536 is equal to 6. The spacing between the dots of a fourth input line 560 divided by the first dot spacing 536 is equal to 1. The spacing between the dots of a fifth input line 564 divided by the first dot spacing 536 is equal to 15. The maximum possible encoded values may be limited by the vertical length of the label or the vertical height of the pill bottle 504. The rectangles shown in the example of FIG. 5 may be included or omitted.

As discussed further below, the pill bottle 504 (including the conductive ink dots) can be rolled across a touchscreen display of a computing device (e.g., a cellular phone, tablet device, etc.). The conductive ink dots appear to the computing device as touch inputs. The pill bottle 504 being cylindrical ensures that only one line of conductive dots contacts the touchscreen device at a time.

Because the start line and the end line have different configurations, the computing device can identify the start line and the end line regardless of whether the pill bottle is rolled start line to end line or end line to start line. If the pill bottle is rolled end line to start line, the computing device may reverse the order of the encoded values such that the encoded values are ordered from start line to end line.

Figure 6:
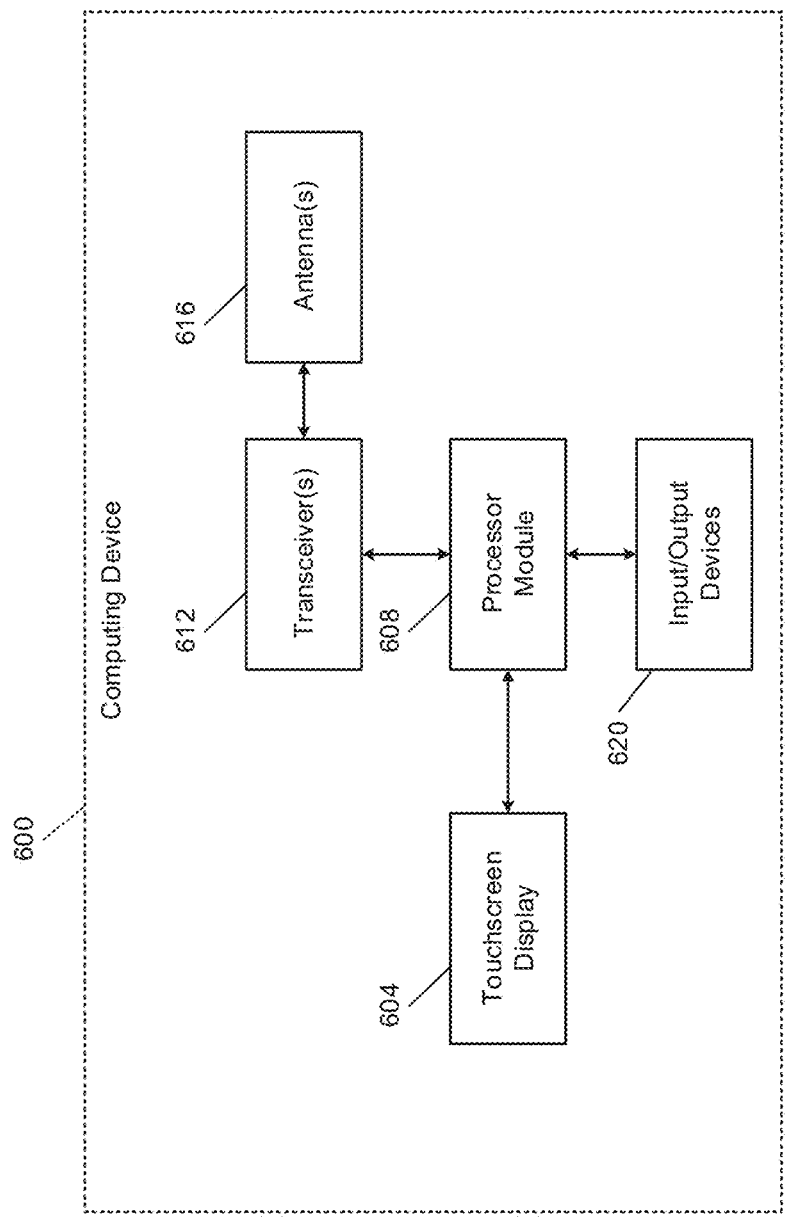
FIG. 6 is a functional block diagram of an example computing device.

FIG. 6 is a functional block diagram of an example computing device 600, such as a cellular phone, a tablet device, a laptop computer, or another suitable type of computing device having one or more touchscreen displays, such as touchscreen display 604.

A processor module 608 displays information, videos, etc. via the touchscreen display 604. The touchscreen display 604 generates output indicative of locations of touches on the touchscreen display 604. The touchscreen display 604 may include a capacitive touchscreen display or another suitable type of touchscreen display.

As discussed above, electrically conductive ink contacting or coming within a predetermined distance of the touchscreen display 604 appears to the touchscreen display 604 as touching. The touchscreen display 604 therefore generates output indicative of the locations of the dots of conductive ink on a pill bottle as the pill bottle is rolled across the touchscreen display 604.

The processor module 608 receives the output of the touchscreen display 604. During execution of an application (e.g., configured to output information regarding the order data for a pill bottle), while the pill bottle is rolled across the touchscreen display 604, the output of the touchscreen display 604 is indicative of the locations of the dots of conductive ink printed on the exterior of the pill bottle.

FIG. 7 is a perspective view illustrating an example of a user rolling a pill bottle with conductive ink across a touchscreen display of a computing device. As illustrated in FIG. 7, the cap having an outer diameter that is greater than a diameter of the pill bottle may align the pill bottle (and therefore the label and the lines of dots of conductive ink) relative to the touchscreen display during the rolling.

The processor module 608 identifies the start line based on the output of the touchscreen display 604 being indicative of touches at locations corresponding to the predetermined configuration of the start line. The processor module 608 identifies the end line based on the output of the touchscreen display 604 being indicative of touches at locations corresponding to the predetermined configuration of the end line.

The processor module 608 identifies the input lines based on the output of the touchscreen display 604 having the third predetermined number of touches along lines. The processor module 608 determines an expected number of input lines based on the distance between the second dot spacing and the third dot spacing of the start line.

The processor module 608 determines whether a valid pattern of conductive ink was rolled across the touchscreen display 604 based on whether a start line was identified, an end line was identified, and whether the expected number of input lines was identified. The processor module 608 may determine that a valid pattern of conductive ink was rolled across the touchscreen display 604 when all of a start line was identified, an end line was identified, and the expected number of input lines was identified. The processor module 608 may determine that a valid pattern of conductive ink was not rolled across the touchscreen display 604 when at least one of a start line was not identified, an end line was not identified, and the expected number of input lines was not identified. If a valid pattern of conductive ink was not rolled across the touchscreen display 604, the processor module 604 may display a message on the touchscreen display 604 that a pattern was not completely rolled across the touchscreen display and to try again.

When a valid pattern was rolled across the touchscreen display 604, the processor module 608 may determine the encoded values for the input lines, respectively. The processor module 608 may determine the encoded values based on the dot spacings of the input lines, respectively, divided by the first dot spacing.

One or more transceivers, such as transceiver 612, may transmit the encoded values via one or more antennas, such as antenna 616. The transceiver 612 may be a cellular transceiver, a wireless transceiver, a wired (e.g., Ethernet) transceiver, or another suitable type of transceiver. The computing device 600 may include one or more input and/or output devices 620, such as one or more buttons, one or more switches, one or more speakers, and/or one or more other suitable types of input and/or output devices. The processor module 608 may take one or more actions in response to input from one or more input devices. The processor module 608 may generate output via one or more output devices.

Figure 8:
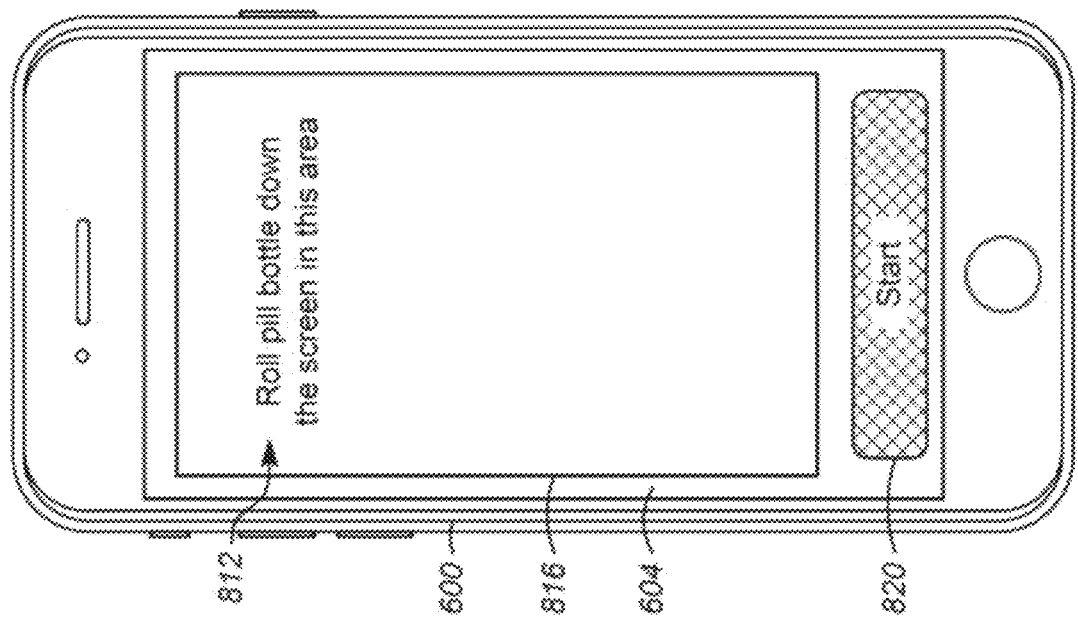
FIGS. 8, 9, and 10 are perspective views including example user interfaces generated by a computing device to collect a pattern of conductive ink dots on an exterior of a pill bottle.
Figure 9:
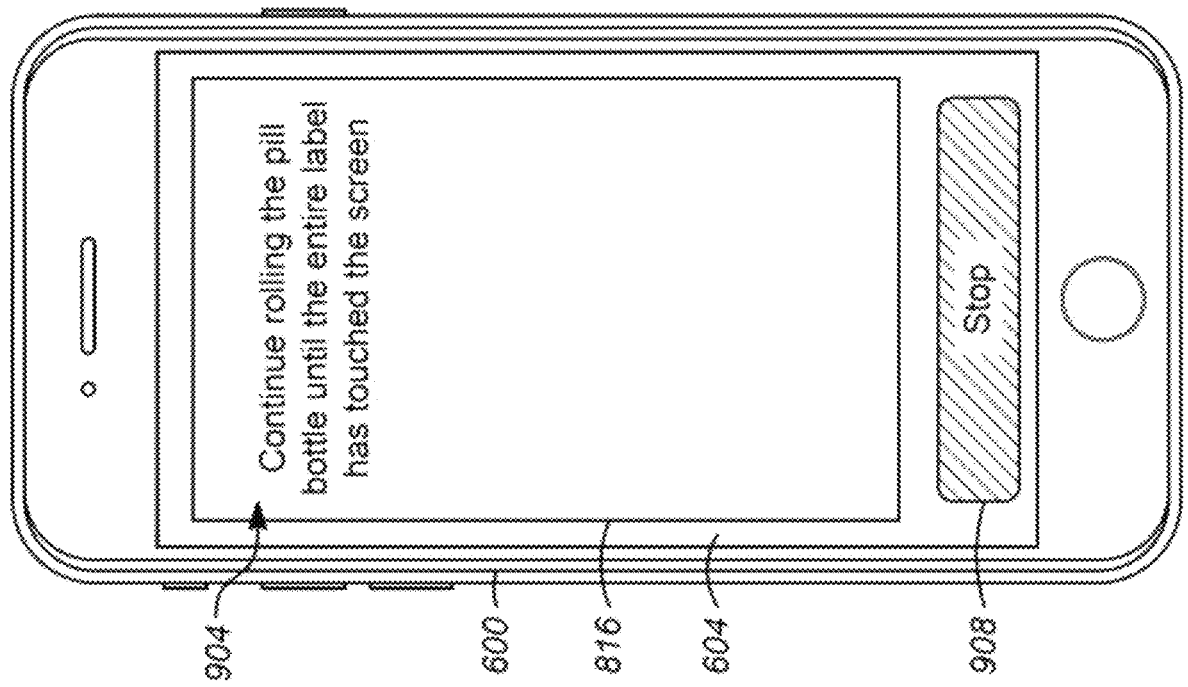

FIGS. 8 and 9 are views of example user interfaces that may be displayed on the touchscreen display 604 of the computing device 600. During execution of the application, before collecting the output of the touchscreen display 604 for the pattern of conductive ink on a pill bottle, the processor module 608 may display a predetermined message 812 on the touchscreen display 604. The predetermined message 812 may, for example, instruct a user to roll a pill bottle on the touchscreen display 604 in a predetermined area 816 of the touchscreen display 604. The processor module 608 may display the predetermined area 816 differently than other portions of the touchscreen display 604. The processor module 608 may also display a predetermined start area 820 on the touchscreen display 604. The processor module 608 may begin storing the output of the touchscreen display 604 in response to the output of the touchscreen display 604 indicating that a touch has been received within the predetermined start area 820.

The processor module 608 may display a predetermined continue message 904 on the touchscreen display 604 after the output of the touchscreen display 604 indicates that a touch has been received within the predetermined start area 820. The predetermined continue message 904 may, for example, instruct a user to continue rolling the pill bottle on the touchscreen display 604 in the predetermined area 816 until the entire label has touched the touchscreen display 604. The processor module 608 may also display a predetermined stop area 908 on the touchscreen display 604. The processor module 608 may stop storing the output of the touchscreen display 604 in response to the output of the touchscreen display 604 indicating that a touch has been received within the predetermined stop area 908. In response to the output of the touchscreen display 604 indicating that a touch has been received within the predetermined stop area 908, the processor module 608 may also identify the start line, the end line, the input lines, and determine whether the pattern of conductive ink dots on the pill bottle is complete, as discussed above. If not, the processor module 608 may output an indication that the pattern of conductive ink on the pill bottle was not completely rolled on the touchscreen display 604.

Figure 10:
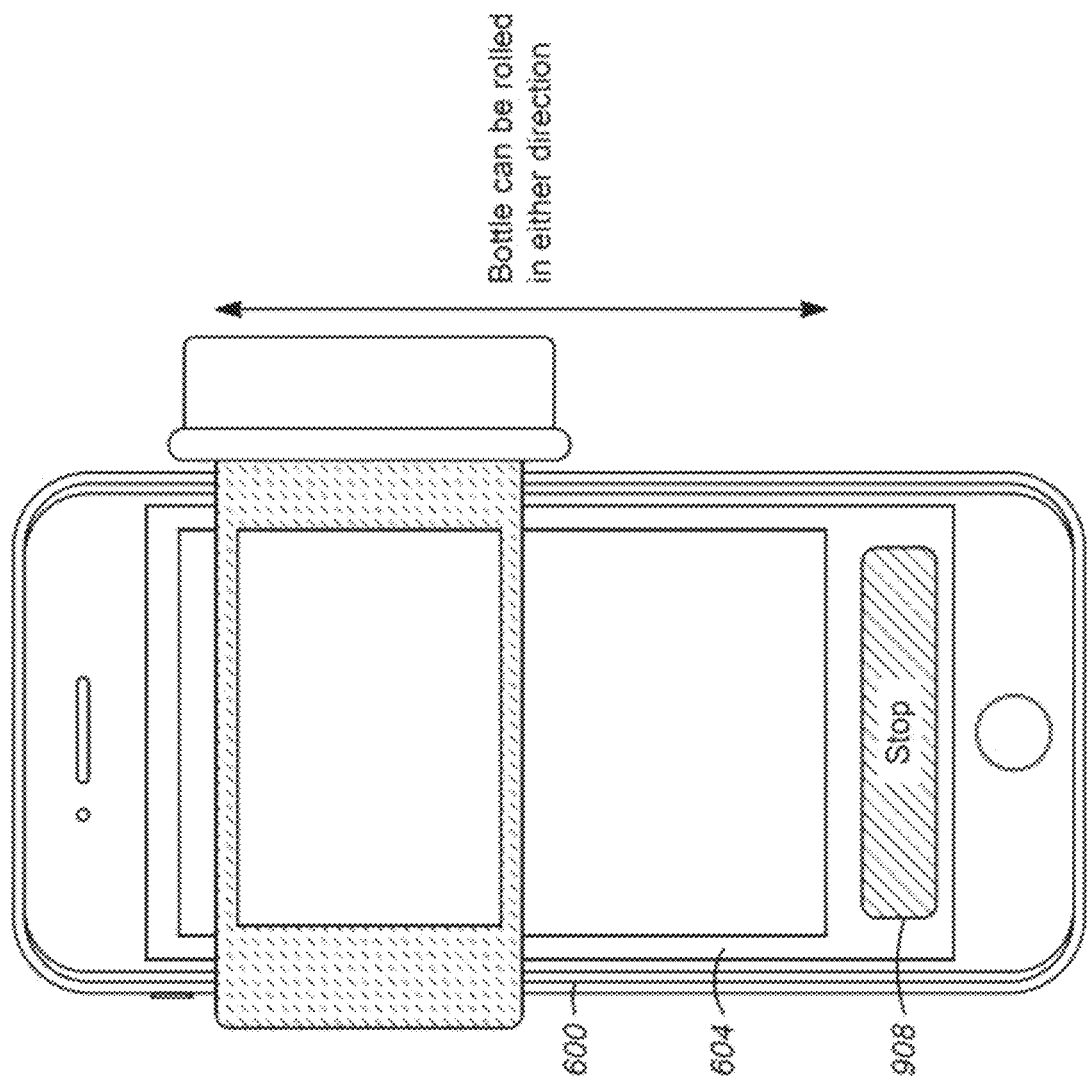

If the pill bottle was rolled end line to start line, the processor module 608 reverses the encoded values corresponding to the input lines. Thus, the pill bottle can be rolled start line to end line, end line to start line, or input line to another input line, etc. This is illustrated in the example of FIG. 10 which includes an example user interface displayed on the touchscreen display 604 of the computing device 600 after the output of the touchscreen display 604 indicates that a touch has been received within the predetermined start area and before the output of the touchscreen display 604 indicates that a touch has been received within the predetermined stop area.

Figure 11:
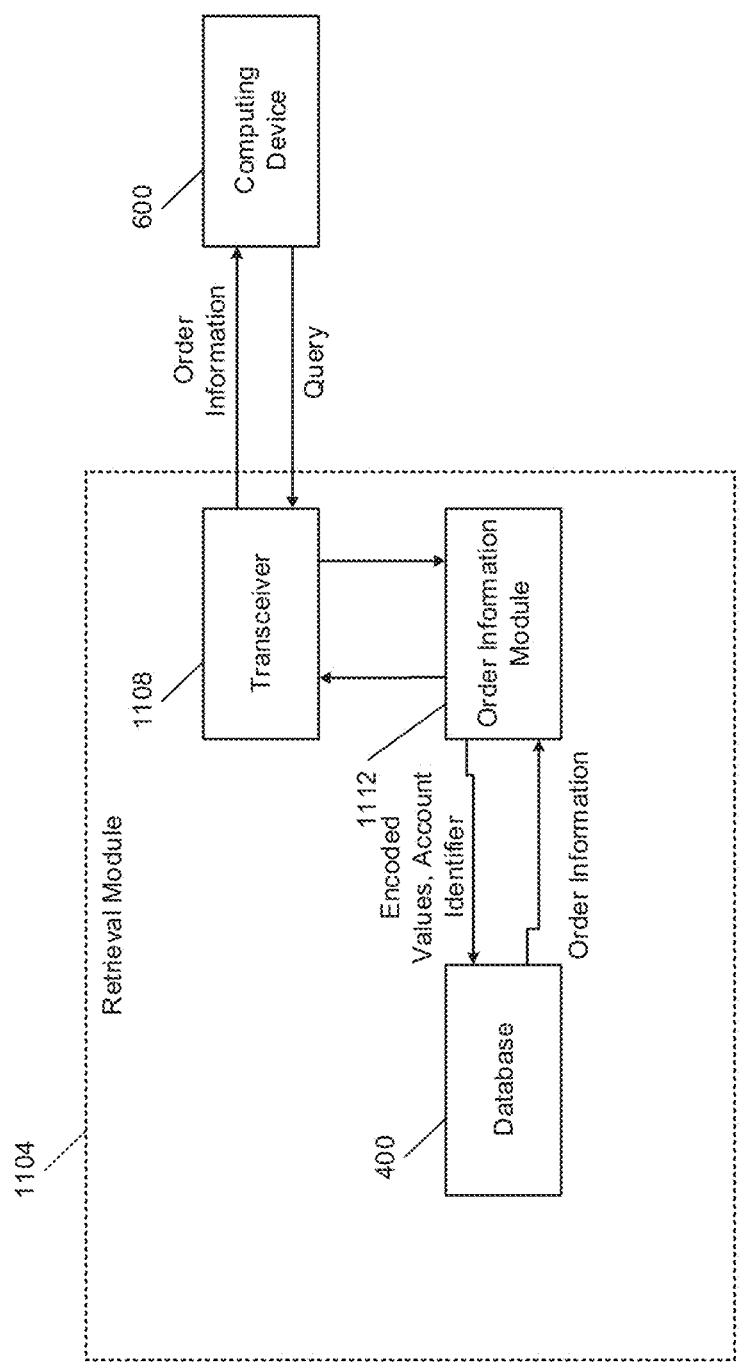
FIG. 11 is a functional block diagram of an example order information retrieval system.

FIG. 11 is a functional block diagram of an example order information retrieval system. The computing device 600 may transmit the encoded values corresponding to the input lines (e.g., from start line to end line) to a retrieval module 1104 via the transceiver 612 and one or more networks, such as the Internet. The computing device 600 may also transmit other information, such as the unique identifier of an account of a user of the computing device 600. The user may log into the account via the unique identifier and a password during execution of the application. In various implementations, the processor module 608 may require that an account be logged into before transmitting the encoded values and other information.

A retrieval module 1104 receives the encoded values and other information transmitted via a transceiver 1108 and the one or more networks. The retrieval module 1104 may be included in a server in various implementations. An order data module 1112 determines whether the encoded values and the unique identifier match (are the same as) any associated (a) unique identifier and (b) encoded values in the database 400. If the unique identifier is not transmitted to the retrieval module 1104, the order data module 1112 may determine whether the received encoded values match a set of encoded values stored in the database 400.

If a match is identified, the order data module 1112 retrieves the order data associated with the matching encoded values (and unique identifier) in the database 400. The transceiver 1108 transmits the order data regarding the pill bottle back to the computing device 600 that transmitted the encoded values (and the unique identifier).

The processor module 608 displays the order data for the pill bottle on the touchscreen display 604. As discussed above, the order data may include at least one of a name of a prescription drug to be included in a pill bottle, a dosage size of each the pills to be included in the pill bottle, a total number of pills of the drug to be included in the pill bottle, a length that the total number of pills is to be used over, a prescription (Rx) number of the prescription, a member name, a date of birth of the member, a fill date of the prescription, a number of refills remaining, an expiration date of the prescription, a name of a prescriber of the prescription, and a phone number of the prescriber. The order information may also include other information. In this manner, the order data is not visible on the label of the pill bottle, but can be retrieved via a computing device with a touchscreen display and the retrieval module 1104 and displayed.

If no match is present, the order data module 1112 may indicate that no order data is found. The transceiver 1108 may transmit an indicator to the computing device 600 indicating that no order information regarding the pill bottle has been found. The processor module 608 may display on the touchscreen display 604 that no order information for the pill bottle is available.

While the example of the computing device 600 determining and transmitting the encoded values is provided, the computing device 600 may alternatively transmit the touch locations, and the retrieval module 1104 may determine the encoded values based on the touch locations.

Figure 12:
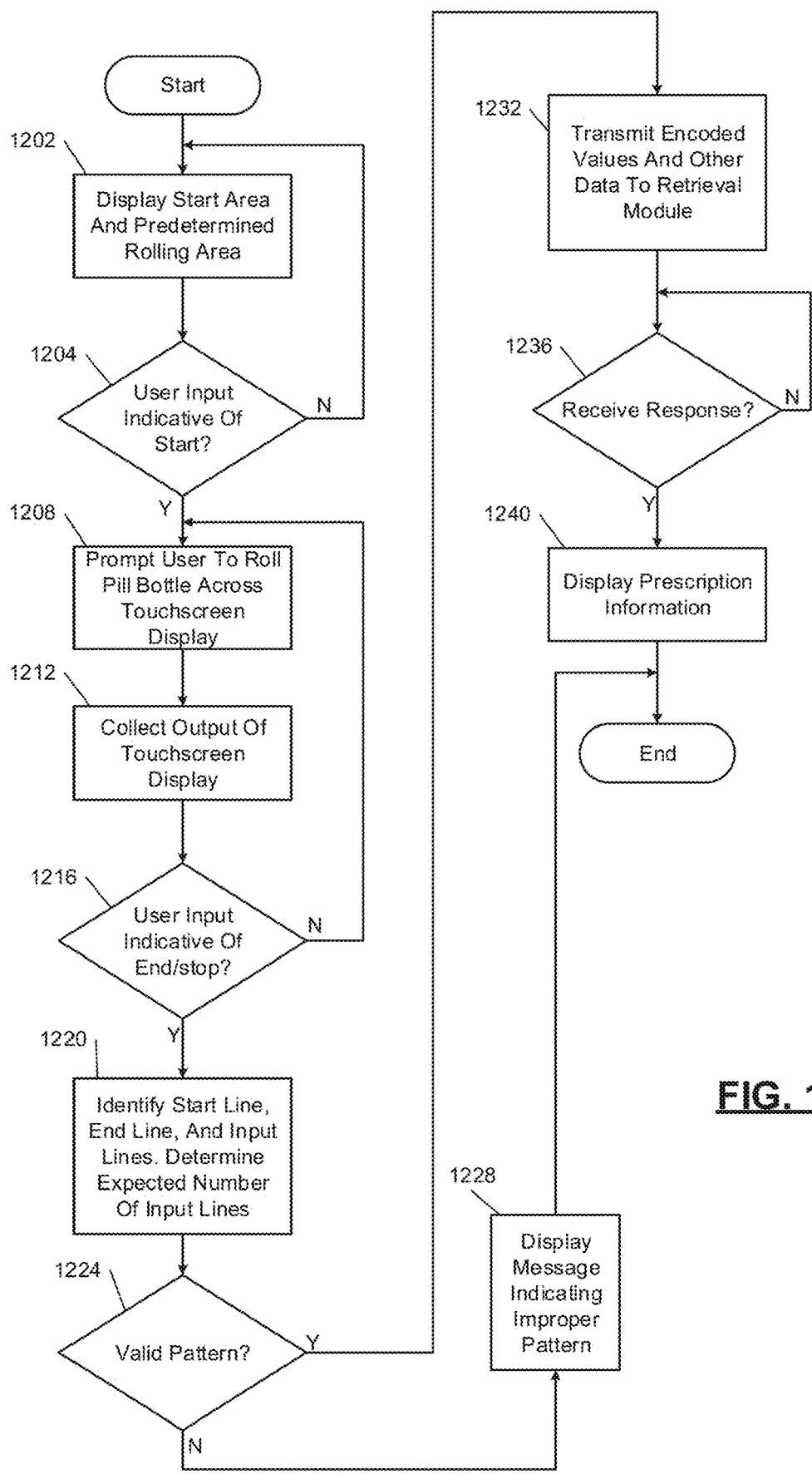
FIG. 12 includes a flowchart depicting an example method of obtaining order information for a pill bottle having electrically conductive ink on an exterior surface or a label.

FIG. 12 includes a flowchart depicting an example method of obtaining order information for a pill bottle having electrically conductive ink on an exterior surface or a label. Control begins with 1202, for example, during execution of the application. The user may have already logged into the account, such as by inputting the unique identifier of the account and a password associated with the account.

At 1202, the processor module 608 displays the predetermined area for rolling the pill bottle across the touchscreen display 604 and the start area, such as shown in the example of FIG. 8. At 1204, the processor module 608 determines whether the output of the touchscreen display 604 is indicative of receiving a touch within the start area. If 1204 is true, control continues with 1208. If 1204 is false, control returns to 1202 and continues displaying the predetermined area and the start area.

At 1208, the processor module 608 displays the predetermined continue message on the touchscreen display 604. At 1212, the processor module 608 collects and stores the output of the touchscreen display 604 indicative of touches within the predetermined area. The output of the touchscreen display 604 may then be indicative of dots of electrically conductive ink on a pill bottle being rolled across the touchscreen display 604. The processor module 608 also displays the stop area on the display, such as shown in the example of FIG. 9.

At 1216, the processor module 608 determines whether the output of the touchscreen display 604 is indicative of receiving a touch within the stop area. If 1216 is true, control continues with 1220. If 1216 is false, control returns to 1208 and continues collecting the output of the touchscreen display 604 within the predetermined area.

At 1220, the processor module 608 identifies the start line, the end line, and the input lines based on the stored output of the touchscreen display 604, as discussed above. Each output may be indicative of a coordinate (e.g., in a coordinate system of the touchscreen display 604) where a touch occurred on the touchscreen display 604 within the predetermined area. The processor module 1220 also determines the expected number of input lines based on the first dot spacing of the input line and the third dot spacing of the input line.

At 1224, the processor module 608 determines whether a valid pattern was received via the touchscreen display 604, as discussed above. If 1224 is false, the processor module 608 displays a message on the touchscreen display 604 indicative of an invalid pattern being input. The processor module 608 may also display a request to try again. If 1224 is true, control continues with 1232.

At 1232, the processor module 608 transmits the encoded values corresponding to the input lines, respectively, (e.g., in order from the side of the start line to side of the end line) via the transceiver 612 to the retrieval module 1104.

At 1236, the processor module 608 determines whether a response including order information for the pill bottle has been received from the retrieval module 1104. If 1236 is false, control may remain at 1236. Control may end if a response is not received from the retrieval module 1104 within a predetermined period. If 1236 is true, control continues with 1240. The response includes the order information for the pill bottle bearing the pattern of dots of conductive ink. At 1240, the processor module 608 may display the order information on the touchscreen display 604.

The user can then view the order information regarding the pill bottle and the contents of the pill bottle via the touchscreen display 604. The user can also initiate one or more other actions, For example, the user can request a refill, create a reminder for dosing, and/or initiate one or more other actions. Also, the pill bottle does not include the order information and the order information is not readily apparent on the exterior of the pill bottle. While control is shown as ending, control may return to 1202.

Figure 13:
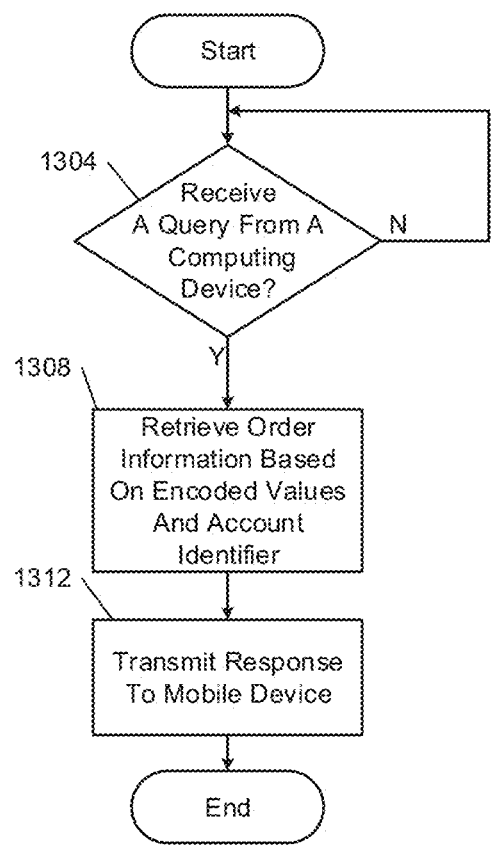
FIG. 13 includes a flowchart depicting an example method of retrieving order information for a pill bottle based on a pattern of conductive ink on the pill bottle identified using a touchscreen display of a computing device.

FIG. 13 includes a flowchart depicting an example method of retrieving order information for a pill bottle based on a pattern of conductive ink on the pill bottle identified using a touchscreen display of a computing device. Control begins with 1304 where the retrieval module 1104 receives a query regarding order information for a pill bottle from a computing device, such as the computing device 600. The computing device generates the query based on a valid pattern of dots of conductive ink on a pill bottle rolled across a touchscreen display of the computing device. The query may include the encoded values of the input lines, respectively, and the unique identifier of an account. The query may also include other information. If 1304 is true, control continues with 1308. If 1304 is false, control may remain at 1304.

At 1308, the order information module 1108 retrieves the order information from the database 400 using the encoded values and the unique identifier of the account. As discussed above, encoded values, unique identifiers of accounts, and order information are stored in association with each other in the database 400. The database 400 may include an object oriented database or another suitable type of database.

At 1312, the order information module 1112 transmits a response to the computer device that transmitted the query. The response includes the order information for the pill bottle having the pattern of conductive ink represented in the query. The computing device can then display the order information for the pill bottle on a display. While control is shown as ending, control may return to 1304.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A pill bottle labeling system, comprising:
   a pattern module configured to generate a pattern of dots of electrically conductive ink to enable reading of the pattern of dots during rotation of a cylindrical pill bottle around an axis of rotation of the cylindrical pill bottle on and across a capacitive touchscreen display, the pattern of dots indicating member data and prescription order data corresponding to the member data,
   wherein the pattern module is configured to generate the pattern of dots to include:
      a start line of dots of electrically conductive ink that has a first configuration and that is to be arranged approximately perpendicularly to circular top and bottom portions of the cylindrical pill bottle;
      an end line of dots of electrically conductive ink that has a second configuration that is different than the first configuration and that is to be arranged approximately perpendicularly to the circular top and bottom portions of the cylindrical pill bottle; and
      at least two input lines of dots of electrically conductive ink that do not have the first or second configuration and that are to be arranged approximately perpendicularly to the circular top and bottom portions of the cylindrical pill bottle;
   a conductive ink printer configured to print the pattern of dots of electrically conductive ink on a first surface of a label;
   the label;
   a labeling device configured to apply a second surface of the label to a cylindrical surface of the cylindrical pill bottle such that the start, end, and input lines of dots are each approximately perpendicular to the circular top and bottom portions of the cylindrical pill bottle;
   the cylindrical pill bottle; and
   a computing device including:
      a capacitive touchscreen display;
      a processor module configured to:
         determine locations of the dots of electrically conductive ink on the label on the cylindrical pill bottle based on an output of the touchscreen display while the cylindrical pill bottle is rotated on and across the touchscreen display;

based on the output of the touchscreen display, determine at least two spacings between the dots of electrically conductive ink of the at least two input lines, respectively, on the label;

determine encoded values for the at least two input lines based on the at least two spacings of the at least two input lines, respectively;

determine whether the pill bottle was rotated from the end line to the start line based on whether the output of the touchscreen display is indicative of receipt of the second configuration before the first configuration; and reverse an order of the encoded values in response to a determination that the cylindrical pill bottle was rotated from the end line to the start line.

2. The pill bottle labeling system of claim 1, wherein the pattern module is further configured to generate the start line of dots to include at least three dots of electrically conductive ink.

3. The pill bottle labeling system of claim 1, wherein the pattern module is further configured to generate the end line of dots to include at least three dots of electrically conductive ink.

4. The pill bottle labeling system of claim 1, wherein the pattern module is further configured to generate:

the input lines of dots to include a first quantity of dots of electrically conductive ink; and the start line of dots and the end line of dots to include a second quantity of dots of electrically conductive ink;

the first quantity and the second quantity comprising integers greater than zero; and the first quantity being greater than or less than the second quantity.

5. The pill bottle labeling system of claim 1, wherein the pattern module is further configured to generate:

the start line of dots to include three dots of electrically conductive ink;

the end line of dots to include three dots of electrically conductive ink; and the input lines of dots to include two dots of electrically conductive ink.

6. The pill bottle labeling system of claim 1, wherein the pattern module is further configured to generate the pattern including:

the input lines of dots being disposed between the start and end lines of dots.

7. The pill bottle labeling system of claim 1, wherein the pattern module is further configured to generate the pattern including:

the start line of dots, the end line of dots, and input lines of dots being approximately parallel.

8. The pill bottle labeling system of claim 1, wherein the pattern module is further configured to generate:

the pattern of electrically conductive ink including at least five input lines of dots of electrically conductive ink, the at least two input lines comprising the at least five input lines.

9. The pill bottle labeling system of claim 1, wherein the pattern module is further configured to:

generate the pattern of dots of electrically conductive ink to represent a name of prescribed pills not present anywhere on the pill bottle, the prescription order data comprising the name.

10. The pill bottle labeling system of claim 1 further comprising:

a randomization module configured to selectively output a randomly generated number, wherein the pattern module is configured to generate the pattern of dots of electrically conductive ink based on the randomly generated number.

11. The pill bottle labeling system of claim 1 wherein the pattern module is configured to generate the pattern of dots of electrically conductive ink based on information regarding a prescription to be included in the cylindrical pill bottle.

12. The pill bottle labeling system of claim 1 wherein the pattern module is further configured to:

generate the dots of electrically conductive ink to include circular shapes.

13. A system, comprising:

at least one processor communicatively coupled to a memory component, a conductive ink printer, and a labeling device;

the memory component having instructions thereon, which, when executed by the at least one processor, perform operations comprising:

generating a pattern of dots of electrically conductive ink, the pattern of dots indicating member data and prescription order data corresponding to the member data, the generating the pattern of dots including generating the pattern of dots including, for reading during rotation of a cylindrical pill bottle about around an axis of the cylindrical pill bottle on and across a capacitive touchscreen display:

a start line of dots of electrically conductive ink that has a first configuration and that is to be arranged approximately perpendicularly to circular top and bottom portions of the cylindrical pill bottle;

an end line of dots of electrically conductive ink that has a second configuration that is different than the first configuration and that is to be arranged approximately perpendicularly to the circular top and bottom portions of the cylindrical pill bottle; and at least two input lines of dots of electrically conductive ink that do not have the first or second configuration and that are to be arranged approximately perpendicularly to the circular top and bottom portions of the cylindrical pill bottle;

printing the pattern of dots of electrically conductive ink on a first surface of a label, via the conductive ink printer; and applying a second surface of the label to a cylindrical surface of the cylindrical pill bottle such that the start, end, and input lines of dots are each approximately perpendicular to circular top and bottom portions of the cylindrical pill bottle and the start, end and input lines of dots, via the labeling device;

the label;

the cylindrical pill bottle; and a computing device including:

a capacitive touchscreen display; and a processor module configured to:

determine locations of the dots of electrically conductive ink on the label on the cylindrical pill bottle based on an output of the touchscreen display while the cylindrical pill bottle is rotated on and across the touchscreen display;

based on the output of the touchscreen display, determine at least two spacings between the dots of electrically conductive ink of the at least two input lines, respectively, on the label;

determine encoded values for the at least two input lines based on the at least two spacings of the at least two input lines, respectively;

determine whether the pill bottle was rotated from the end line to the start line based on whether the output of the touchscreen display is indicative of receipt of the second configuration before the first configuration; and reverse an order of the encoded values in response to a determination that the cylindrical pill bottle was rotated from the end line to the start line.

14. The system of claim 13, wherein the operations further comprise:
applying the second surface of the label to the cylindrical surface of the cylindrical pill bottle to position the start line of dots, the end line of dots, and the input lines of dots approximately parallel to a set of walls of the cylindrical pill bottle.

15. The system of claim 9, wherein the operations further comprise:
generating the dots of electrically conductive ink to include circular shapes.

16. The system of claim 13, wherein the operations further comprise: selectively outputting a randomly generated number; and
generating the pattern of dots of electrically conductive ink based on the randomly generated number.

17. A method, comprising:
generating a pattern of dots of electrically conductive ink, by at least one processor communicatively coupled to at least one memory component, the pattern of dots indicating member data and prescription order data corresponding to the member data, the pattern of dots including for reading during rotation of a cylindrical pill bottle about around an axis of the cylindrical pill bottle on and across a capacitive touchscreen display:
  a start line of dots of electrically conductive ink that has a first configuration and that is to be arranged approximately perpendicularly to circular top and bottom portions of the cylindrical pill bottle;
  an end line of dots of electrically conductive ink that has a second configuration that is different than the first configuration and that is to be arranged approximately perpendicularly to the circular top and bottom portions of the cylindrical pill bottle; and
  at least two input lines of dots of electrically conductive ink that do not have the first or second configuration and that are to be arranged approximately perpendicularly to the circular top and bottom portions of the cylindrical pill bottle;

printing the pattern of dots of electrically conductive ink on a first surface of a label, by a conductive ink printer communicatively coupled to the at least one processor;

applying a second surface of the label to a cylindrical surface of a cylindrical pill bottle such that the start, end, and input lines of dots are each approximately perpendicular to circular top and bottom portions of the cylindrical pill bottle and the start, end and input lines of dots, by a labeling device communicatively coupled to the at least one processor;

rotating the cylindrical pill bottle with the label on and across a capacitive touchscreen display;

determining locations of the dots of electrically conductive ink on the label on the cylindrical pill bottle based on an output of the capacitive touchscreen display during the rotation of the cylindrical pill bottle on and across the capacitive touchscreen display;

based on the output of the touchscreen display, determining at least two spacings between the dots of electrically conductive ink of the at least two input lines, respectively, on the label;

determining encoded values for the at least two input lines based on the at least two spacings of the at least two input lines, respectively;

determining whether the pill bottle was rotated from the end line to the start line based on whether the output of the touchscreen display is indicative of receipt of the second configuration before the first configuration and reversing an order of the encoded values in response to a determination that the cylindrical pill bottle was rotated from the end line to the start line.

18. The method of claim 17, wherein generating the pattern of dots includes generating the pattern of dots such that:
the at least two input lines of dots are disposed between the start line of dots and the end line of dots.

19. The method of claim 17 further comprising generating the pattern of dots such that the at least two input lines of dots are parallel to the start line of dots and the end line of dots.

20. The method of claim 17, further comprising:
storing the pattern of dots in association with the prescription order data and a user account indicated by the member data, in the at least one memory component,
the pattern and the user account being accessible to determine the order data for the pill bottle.

* * * * *